US011321784B2

(12) United States Patent
Verma et al.

(10) Patent No.: US 11,321,784 B2
(45) Date of Patent: May 3, 2022

(54) METHODS AND SYSTEMS FOR AUTOMATICALLY DETECTING FRAUD AND COMPLIANCE ISSUES IN EXPENSE REPORTS AND INVOICES

(71) Applicants: Kunal Verma, Sunnyvale, CA (US); Anant d Kale, Sunnyvale, CA (US)

(72) Inventors: Kunal Verma, Sunnyvale, CA (US); Anant d Kale, Sunnyvale, CA (US)

(73) Assignee: APPZEN, INC., San Jose, CA (US)

( * ) Notice: Subject to any disclaimer, the term of this patent is extended or adjusted under 35 U.S.C. 154(b) by 925 days.

(21) Appl. No.: 15/146,880

(22) Filed: May 4, 2016

(65) Prior Publication Data
US 2016/0358268 A1 Dec. 8, 2016

Related U.S. Application Data

(63) Continuation-in-part of application No. 14/198,523, filed on Mar. 5, 2014, now Pat. No. 9,460,155.

(60) Provisional application No. 62/157,108, filed on May 5, 2015, provisional application No. 62/331,963, filed on May 4, 2016, provisional application No.
(Continued)

(51) Int. Cl.
*G06Q 40/00* (2012.01)
*G06N 7/00* (2006.01)
*G06N 5/04* (2006.01)
*G06N 20/00* (2019.01)
*G06F 16/2455* (2019.01)
*G06F 16/2453* (2019.01)
(Continued)

(52) U.S. Cl.
CPC ....... *G06Q 40/12* (2013.12); *G06F 16/24542* (2019.01); *G06F 16/24564* (2019.01); *G06F 40/30* (2020.01); *G06N 5/047* (2013.01); *G06N 7/005* (2013.01); *G06N 20/00* (2019.01); *G06N 20/10* (2019.01)

(58) Field of Classification Search
CPC ......... G06F 17/30867; G06F 16/24542; G06F 40/30; G06Q 40/12; G06Q 20/4016; G06Q 30/0185; G06N 20/00
See application file for complete search history.

(56) References Cited

U.S. PATENT DOCUMENTS 6,826,473 B1 * 11/2004 Burch .................... G01C 21/20
342/357.46
7,480,640 B1 * 1/2009 Elad ....................... G06Q 10/10
706/14
(Continued)

*Primary Examiner* — Florian M Zeender
*Assistant Examiner* — Milena Racic
(74) *Attorney, Agent, or Firm* — Cooley LLP

(57) ABSTRACT

In one aspect a computerized method for detecting anomalies in expense reports of an enterprise includes the step of implementing a semantic analysis algorithm on an expense report data submitted by an employee, wherein the expense report data is provided in a computer-readable format. The method includes the step of, with one or more machine learning algorithms, detecting an anomaly in expense report data. The method includes the step of obtaining an augmentation of the expense report data with a set of web scale data. The method includes the step of verifying receipts associated with an expense report. The method includes the step of determining that the employee or any employee has previously claimed an expense in the expense report data. The method includes the step of identifying an inappropriate expense in the expense report data.

20 Claims, 12 Drawing Sheets

Related U.S. Application Data

61/773,145, filed on Mar. 6, 2013, provisional application No. 61/948,489, filed on Mar. 5, 2014.

(51) Int. Cl.
  *G06F 40/30* (2020.01)
  *G06N 20/10* (2019.01)

(56) References Cited

U.S. PATENT DOCUMENTS

| | | | | |
|---|---|---|---|---|
| 9,245,296 | B2* | 1/2016 | Nuggehalli | G06Q 40/12 |
| 9,336,302 | B1* | 5/2016 | Swamy | G06F 16/2465 |
| 9,529,863 | B1* | 12/2016 | Gindin | G06Q 40/00 |
| 9,659,327 | B2* | 5/2017 | Nuggehalli | G06Q 10/105 |
| 9,779,384 | B2* | 10/2017 | Fredericks | G06Q 20/24 |
| 10,332,213 | B2* | 6/2019 | Nuggehalli | G06Q 10/06 |
| 2005/0222929 | A1* | 10/2005 | Steier | G06Q 40/00 705/35 |
| 2010/0076836 | A1* | 3/2010 | Giordano | G06Q 20/20 705/14.38 |
| 2012/0109854 | A1* | 5/2012 | Thomas | G06Q 40/02 705/500 |
| 2012/0185368 | A1* | 7/2012 | Schloter | G06Q 40/12 705/30 |
| 2012/0209640 | A1* | 8/2012 | Hamper | G06Q 40/12 705/5 |
| 2014/0019267 | A1* | 1/2014 | Stoliartchouk | G06F 9/00 705/14.73 |
| 2015/0026027 | A1* | 1/2015 | Priess | G06Q 20/4016 705/35 |
| 2015/0095203 | A1* | 4/2015 | Howe | G06Q 40/12 705/30 |
| 2016/0085827 | A1* | 3/2016 | Chadha | G06F 17/30536 707/776 |
| 2018/0082368 | A1* | 3/2018 | Weinflash | G06Q 40/02 |

* cited by examiner

METHODS AND SYSTEMS FOR AUTOMATICALLY DETECTING FRAUD AND COMPLIANCE ISSUES IN EXPENSE REPORTS AND INVOICES

This application claims priority from U.S. Provisional Application No. 62/157,108, title METHODS AND SYSTEMS OF COMPLIANCE AND DETECTING FRAUD IN EXPENSE REPORTS and filed 5 May 2015. This application claims priority from U.S. Provisional Application No. 62/331,963, title METHODS AND SYSTEMS OF COMPLIANCE AND DETECTING FRAUD IN EXPENSE REPORTS and filed 5 May 2016. This application is hereby incorporated by reference in its entirety for all purposes. This application claims priority from U.S. patent application Ser. No. 14/198,523 filed Mar. 5, 2014. This application is hereby incorporated by reference in its entirety for all purposes.

BACKGROUND

1. Field

This application relates generally to semantic analysis, and more specifically to a system, article of manufacture and method for automatically detecting fraud and compliance issues in expense reports and invoices.

2. Related Art

Employees of an enterprise (e.g. a company, a non-profit organization, etc.) can be sent on business trips. Employees can accrue various expenses. To be reimbursed for said expenses, employees can submit expense reports to the enterprise. However, some employees may attempt to game the system and file false expense reports. Other employees may honestly file duplicate expense report items as well. Some employees can include non-approved expenses or expenses that are against company policy. Accordingly, enterprises can spend funds on false, dishonest and/or mistakenly filed expenses reports. Therefore, improvements to detecting these faults in expense reports can save enterprises money and time in investigating expense report fraud.

BRIEF SUMMARY OF THE INVENTION

In one aspect a computerized method for detecting anomalies in expense reports of an enterprise includes the step of implementing a semantic analysis algorithm on an expense report data submitted by an employee, wherein the expense report data is provided in a computer-readable format. The method includes the step of, with one or more machine learning algorithms, detecting an anomaly in expense report data. The method includes the step of obtaining an augmentation of the expense report data with a set of web scale data. The method includes the step of verifying receipts associated with an expense report. The method includes the step of determining that the employee or any employee has previously claimed an expense in the expense report data. The method includes the step of identifying an inappropriate expense in the expense report data.

Figure 1:
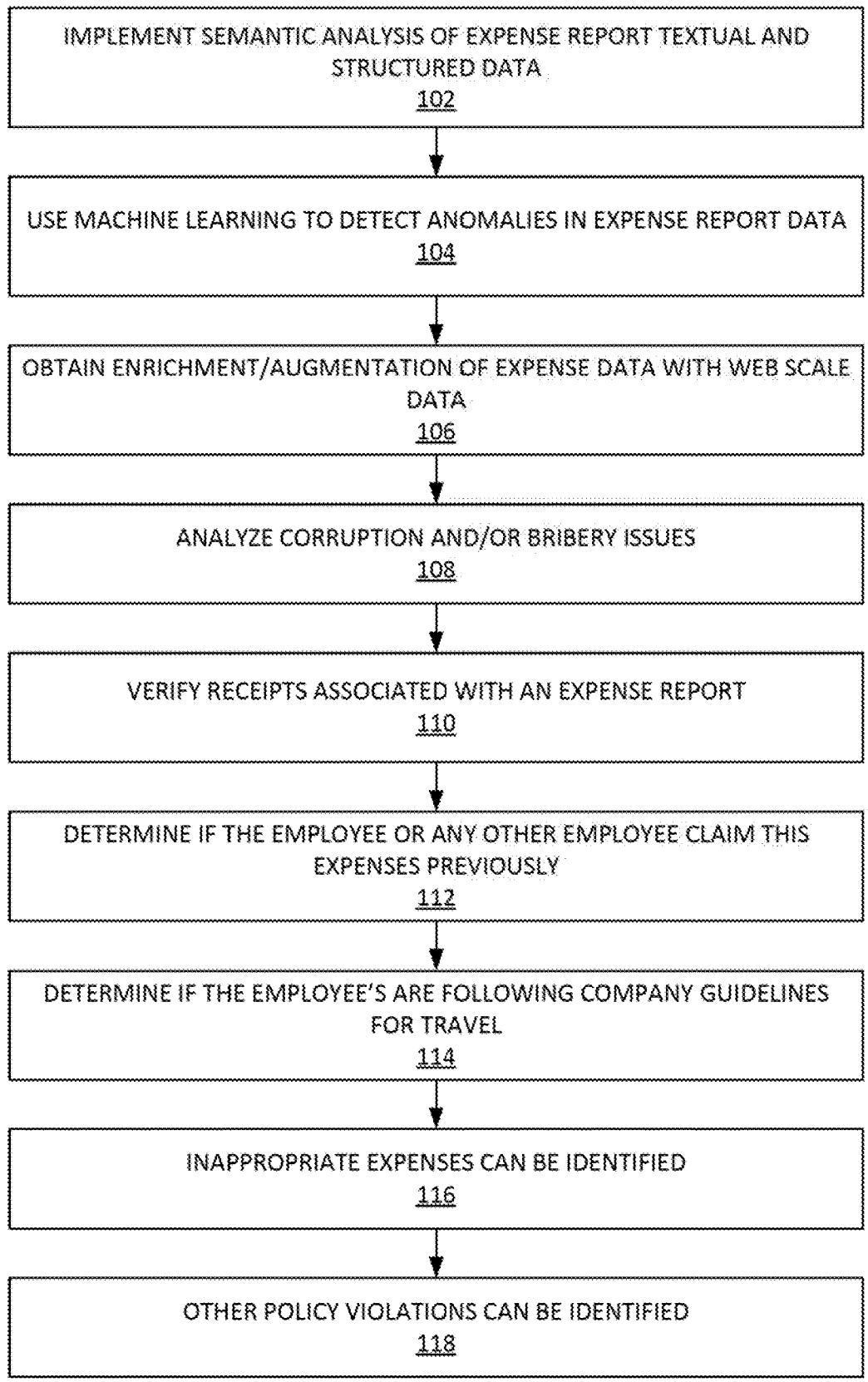
FIG. 1 illustrates an example process of fraud and compliance issues detection framework, according to some embodiments.

The Figures described above are a representative set, and are not exhaustive with respect to embodying the invention.

DESCRIPTION

Disclosed are a system, method, and article of manufacture for automatically detecting fraud and compliance issues in expense reports and invoices. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, machine learning techniques, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Deep-learning algorithms can be based on a set of algorithms that attempt to model high-level abstractions in data by using multiple processing layers, with complex structures or otherwise, composed of multiple non-linear transformations.

Expense report can be a form of document that contains the expenses that an individual has incurred as a result of the business operation. For example, if the owner of a business travels to another location for a meeting, the cost of travel, the meals, and all other expenses that he/she has incurred may be added to the expense report. Consequently, these expenses will be considered business expenses and are tax deductible.

Histogram can be a graphical representation of the distribution of numerical data. It is an estimate of the probability distribution of a continuous variable (e.g. quantitative variable).

Interquartile range (IQR), also called the midspread or middle fifty, is a measure of statistical dispersion, being equal to the difference between the upper and lower quartiles, IQR=Q3−Q1.

Kernel machine learning can be a class of pattern analysis.

Level three (3) credit card processing can capture of a specific line item data in a credit card transaction. These additional data fields can include merchant name and/or address, invoice number and/or tax amount, plus line item details such as item description, quantity and/or unit of measure, freight amount, and/or commodity and/or product codes, etc.

Logistic regression can estimate the parameters of a qualitative response model. The probabilities describing the possible outcomes of a single trial can be modeled, as a function of the explanatory (predictor) variables, using a logistic function.

Machine learning systems can use algorithms that can learn from and make predictions on data.

Natural language processing (NLP) can be the field of computer science concerned with human speech as it is spoken. Various NLP models can be utilized herein, including, inter alia: automatic summarization; co-reference resolution; discourse analysis; machine translation; morphological segmentation; named entity recognition; natural language generation; natural language understanding; OCR; parsing; part-of-speech tagging; sentiment analysis; speech recognition; speech segmentation; topic segmentation; word segmentation; information retrieval; word sense disambiguation; etc.

Neural networks can be statistical learning algorithms used to estimate or approximate functions that can depend on a large number of inputs and are generally unknown.

Office of Foreign Assets Control (OFAC) is a financial intelligence and enforcement agency of the U.S. government charged with planning and execution of economic and trade sanctions in support of U.S. national security and foreign policy objectives.

Optical character recognition (OCR) can convert of images of text into characters.

Politically exposed person (PEP) is a term describing someone who has been entrusted with a prominent public function. A PEP generally presents a higher risk for potential involvement in bribery and corruption by virtue of their position and the influence that they may hold.

Semantic analysis of a corpus is the task of building structures that approximate concepts from a large set of documents. Example semantic analysis techniques can include, inter alia: latent semantic analysis, n-grams and hidden Markov models, Latent Dirichlet allocation, etc.

Support vector machines (SVMs) can be, supervised learning models with associated learning algorithms that analyze data and recognize patterns, used for classification and regression analysis.

Transparency International is an international non-governmental organization which is based in Berlin, Germany. Its nonprofit purpose is to take action to combat corruption and prevent criminal activities arising from corruption. It publishes for example the Global Corruption Barometer and the Corruption Perceptions Index.

Exemplary Methods

FIG. 1 illustrates an example process 100 of fraud and compliance issues detection framework, according to some embodiments. In step 102, process 100 can implement semantic analysis of expense report textual and structured data. For example, process 100 can understand expense-meanings based on semantic models/ontologies. For example, a parking expense can have different properties than an Internet expense. Step 102 can use semantic analysis to differentiate a customer meal from an individual meal from a team meal based on a user's textual entry. Step 102 can use semantic analysis to determine if the expense report is for a customer trip or team meeting. Step 102 can use semantic analysis to determine if there is an associated itinerary and/or credit-card charges.

In step 104, process 100 can use machine learning to detect anomalies in expense report data. Step 104 can involve employee profiling to determine if the employee is a habitual offender. Machine learning can be used to classify an expense as opportunistic or accidental fraud based on employee's history. Machine learning can also be used for spend profiling. For example, it can be determined if spending one-thousand dollars ($1000.00) on a customer meal is considered normal for that company or employee role. it can be determined if the expense unreasonably high for one person for a restaurant.

In step 106 process 100 can obtain enrichment/augmentation of expense data with web scale data. Step 106 can use web-scale sources (e.g. web search, Yelp®, TripAdvisor®, Wikipedia, DBPedia, etc.) to augment user-entered data.

In step 108, process 100 can analyze corruption and/or bribery issues. For example, step 108 can verify that the employee attended a specified meeting, conference, etc. Step 108 can determine if the employee and/or guest is a PEP (politically exposed person) or on a OFAC list. Step 108 can determine if a guest is a fictional person. Step 108 can obtain customer/vendor verifications to determine that the customer (e.g. a company the guest works for, etc.) or vendor exists. Step 108 can determine if the customer and/or vendor has been linked in PEPS and/or other fraud cases in the past. Step 108 can also assess a foreign location risk. For example, if the meeting/conference occurred in a foreign location, step 108 can determine if the location is considered risky. It can also be determined if the amount spent too high for that country (e.g. above a historical average spending for the country, etc.).

In step 110, process 100 can verify receipts associated with an expense report. Step 110 can determine if the receipts are valid and match the claimed expenses. In step 112, process 100 can detect duplicate claims expenses. For example, step 112 can determine if the employee or any other employee claim this expenses previously (e.g. on other past expense reports, etc.).

In step 114, process 100 can identify travel violations. Step 114 can determine if the employees are following company guidelines for travel. Travel guidelines can be maintained in a database and compared with the employee's claim travel in an expense report. In one example, it can be determined if the employee can use a corporate site and/or booked tickets in an approved travel class. In step 116, inappropriate expenses can be identified. For example, employee's purchase of alcohol can be determined to be or not be in compliance with a company policy. The location of the expense/purchase can also be identified. It can be determined if the location is allowed by company policy. For example, it can be determined if 'Joes's bar is a strip club or a restaurant. Process 100 can be utilized various searches of the Internet and analysis of location webpages to make this determination. In step 118, other policy violations can be identified. It can be determined if the expense meets company policies. For example, a company can have an annual limit for tuition reimbursement at two-thousand dollars ($2000.00). It can be determined if the employee is claiming great than said limit. Process 100 can augment expense data with multiple sources, including, inter alia: web-scale data, itineraries, credit-card level three (3) data, customer relationship management (CRM) and/or other enterprise system data, receipts data, etc. (e.g. see process 200 of FIG. 2 infra). Process 100 can be used to generate a risk score.

Figure 2:
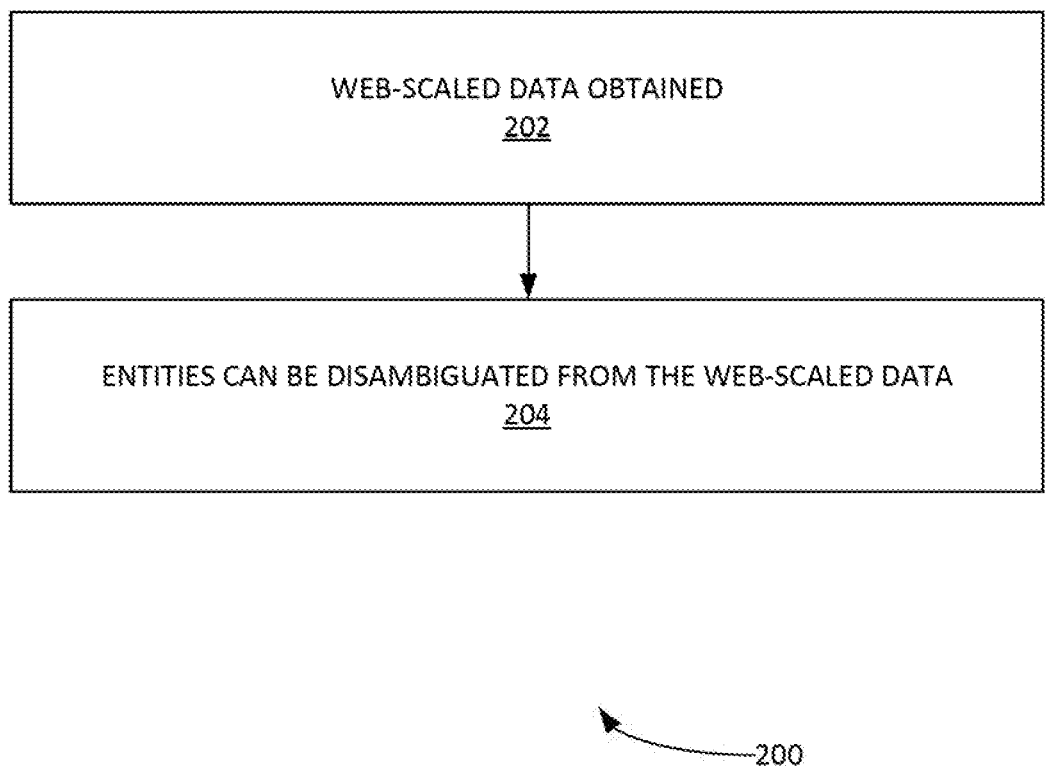
FIG. 2 illustrates an example process of enrichment/augmentation of expense data with web scale data, according to some embodiments.

FIG. 2 illustrates an example process 200 of enrichment/augmentation of expense data with web scale data, according to some embodiments. In step 202, web-scaled data can be obtained. As noted supra, data sources can include, inter alia: Yelp®, TripAdvisor®, Expedia®, Factual®, DBPedia®, Wikipedia, a web search, etc.). Step 202 can be used to validate whether an attendee/merchant/vendor is not fictional. Step 202 can be used compare average cost of a meal on Yelp® against amount spent per attendee at a restaurant. Step 202 can be used predict whether an attendee is associated with or is a PEP. Step 202 can be used identify expense location. For example, if the user enters a two-hundred dollars ($200) expense for Starbucks with only attendee. The system would mark that as high risk, since most sources show that the average spend at Starbucks is only ten dollars ($10) per person. At the same time, a two-hundred dollars ($200) spend at Buca di Beppo with eight (8) attendees will not marked as high risk, since the average per person there is over thirty dollars ($30) per person.

In step 204, entities can be disambiguated from the web-scaled data. Step 204 can retrieve short documents (e.g. identity names), which maintain both high recall and/or precision rate. Step 204 can determine a string-based and term-based text similarity (e.g. as provided in U.S. Provisional Application No. 62/157,108, title METHODS AND SYSTEMS OF COMPLIANCE AND DETECTING FRAUD IN EXPENSE REPORTS and filed 5 May 2015). Step 204 can then determine a phonetic-based text similarity. Step 204 can then implement a rule-based approach to retain relevant documents. Step 204 can then retrieve a relevant name of an entity related to the expenses (e.g. a name of a restaurant, a hotel, a person, etc.).

Figure 3:
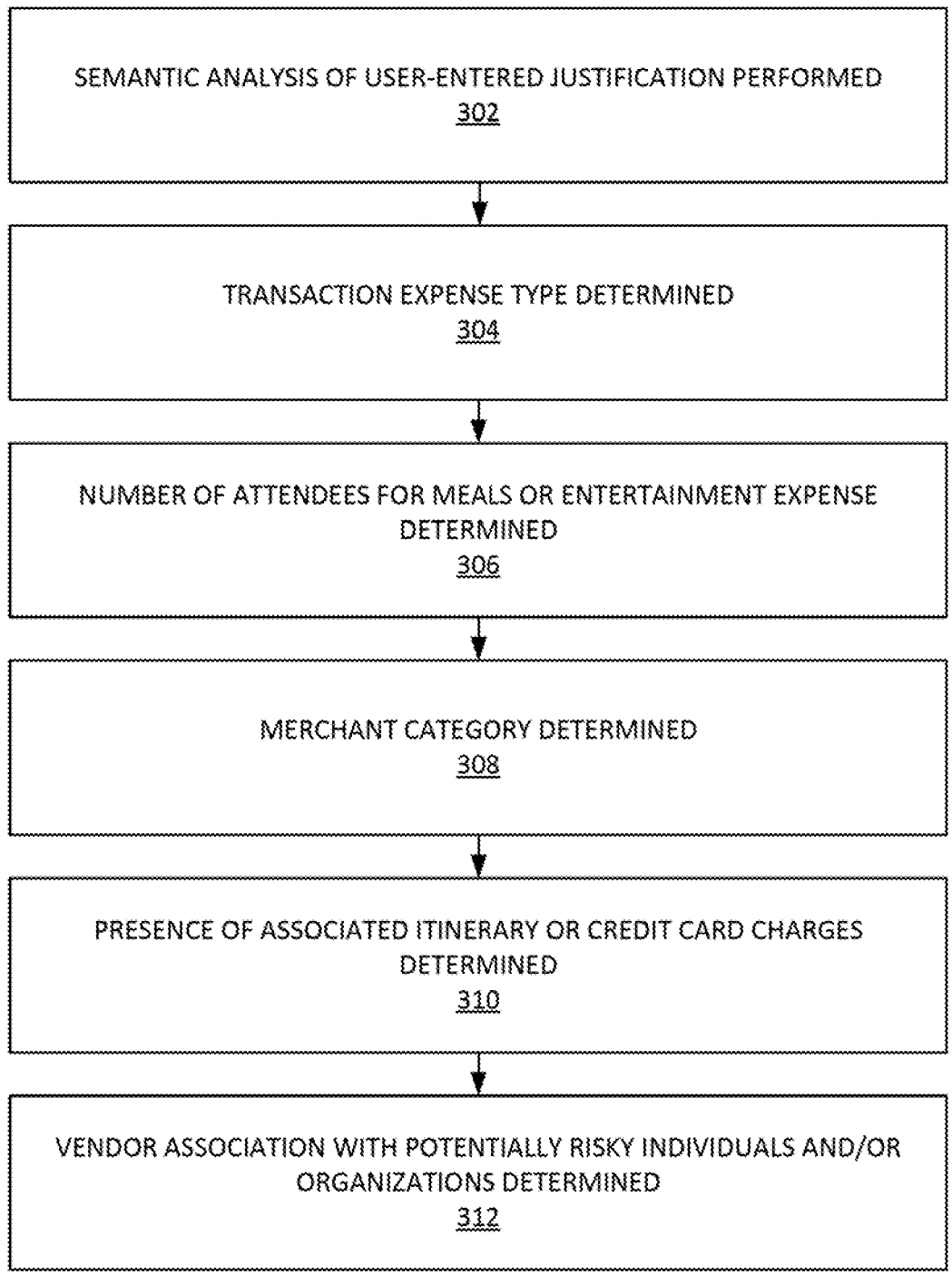
FIG. 3 illustrates an example process for servant analysis of expense report textual and structured data, according to some embodiments.

FIG. 3 illustrates an example process 300 for semantic analysis of expense report textual and structured data, according to some embodiments. In step 302, a semantic analysis of user-entered justification can be performed.

In step 304, a transaction expense type can be determined. For example, if a user enters "Taxi from office to San Francisco", the system infers that the expense is related to a taxi related expense. This is done using Probabilistic Information Extraction defined in U.S. patent application Ser. No. 14/198,523 and using an Expense ontology that defines different categories of expenses such as Airfare, Hotels, Parking, Meals etc. and their attributes such as source and destination for airfare and number of days for parking. The system further uses mapping APIs and the government/corporate mileage rate to verify if the mileage claimed In step 306, a number of attendees for meals or entertainment expense can be determined. For example, if a user enters "Lunch with John Doe and Jane Doe". The system infers that is a Meal expense and there were three attendees (e.g. the user, John Doe and Jane Doe).

In step 308, a merchant category (e.g. airlines/memberships) can be determined. For example, consider that the user enters "Starbucks" as the merchant. In that case, the system crawls the Web for various sources and figures out that Starbucks is a Coffee Shop and is typically associated with Meal Expenses. In other cases, if the user enters Joe's bar as the merchant, the system can try to verify whether the Joe's Bar is a restaurant or an Adult Entertainment Place.

In step 310, a presence of associated itinerary or credit card charges can be determined. That is used as additional context in interpreting a risk on an expense. For example, if the itinerary shows that the user is in San Diego from January 12 to January 15. However, if the user claims a meal in Chicago on January 13, the system will flag that as a risk.

In step 312, a vendor association with potentially risky individuals, politically exposed persons (PEP) and/or organizations can be determined. If a user enters "Lunch with prospect John Doe", then the system will initially infer that "John Doe" is a person and then it would use techniques defined later to detect if John Doe is a politically exposed person.

Figure 4:
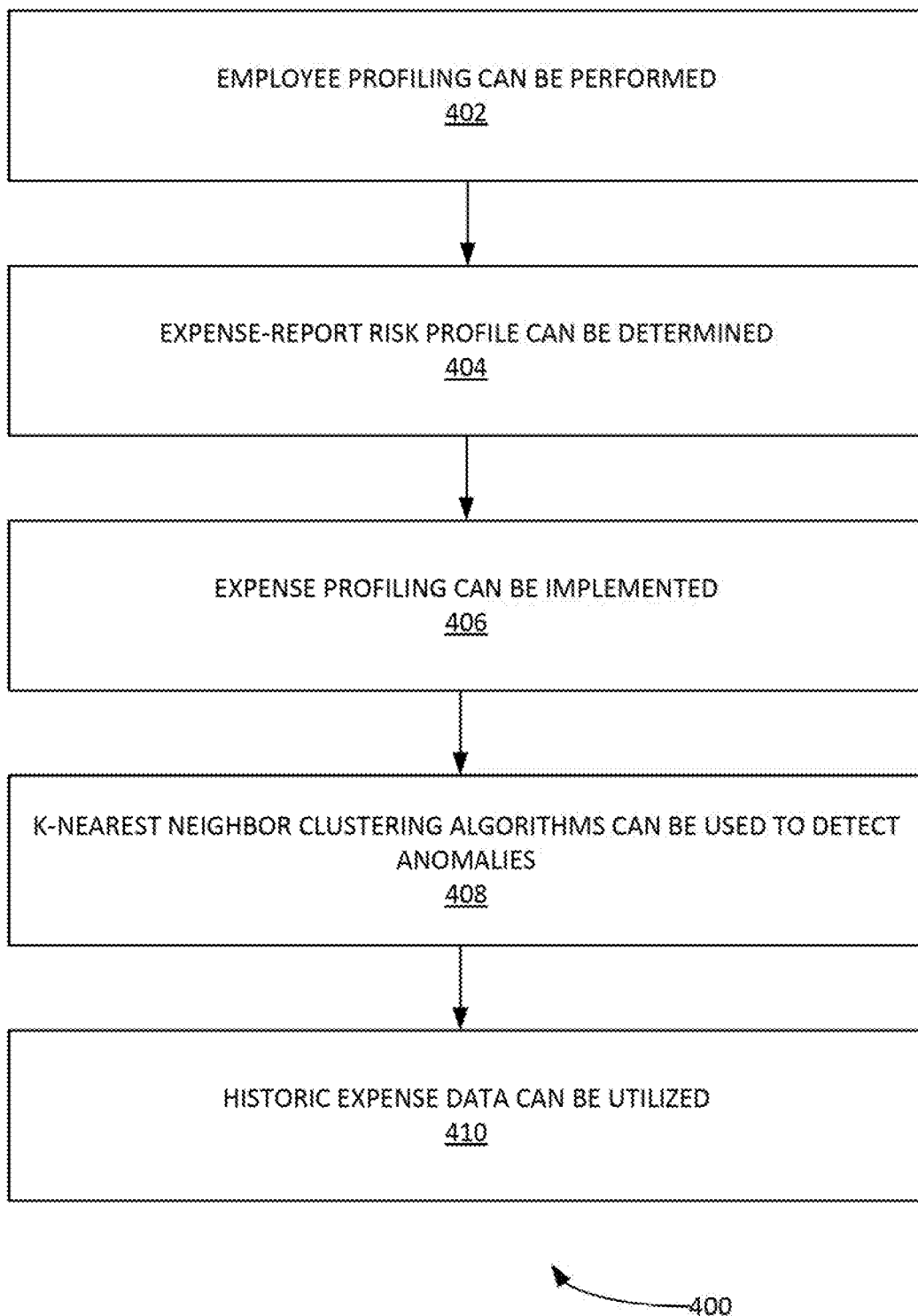
FIG. 4 illustrates an example process that uses machine learning to detect anomalies in expense report data, according to some embodiments.

FIG. 4 illustrates an example process 400 that uses machine learning to detect anomalies in expense report data, according to some embodiments. In step 402, employee profiling can be performed. Various machine learning and/or anomaly detection process can be performed on historical expense data associated with an employee to identify habitual, opportunistic and/or accidental fraud in employee spending. Quantitative and/or qualitative features can be measured against other employee cohorts in the enterprise. Example, quantitative features can include calculating Z-scores of historical spend amounts, cash to credit ratios, number of expense lines with missing receipts. Example, qualitative features can include job function and/or rank within company (e.g. as retrieved from LinkedIn® and/or other business-oriented social networking service). Example, machine-learning algorithms that can be applied include SVM, kernel algorithms and/or logistic regression algorithms. For example, a radial basis kernel algorithm can be used. Additionally, various deep-learning algorithms can be applied as well. Example deep-learning algorithms can include artificial neural networks and the like.

In step 404, an expense-report risk profile can be determined. Use machine learning to classify whether a report submitted by an employee is of high, medium or low risk by assigning weights to different policy violations across expense lines and studying employee profile data. The system is by using historical risk and behavioral data for employees. This is done using Z-scores for different risk and behavioral features.

A Z-score is a statistical measurement of a score's relationship to the mean in a group of scores. A Z-score of 0 means the score is the same as the mean. A Z-score can also be positive or negative, indicating whether it is above or below the mean and by how many standard deviations. For example, Z-score of amount of cash expenses by a user relative to his company is calculated as follows: Let amount of cash expense for user be x. Let average amount of cash expenses across all users in a company be avg(cash). Let standard deviation of cash expenses across all users in a company be std(cash). Then the Z-score can be calculated as follows:

$$Z\text{-score} = \frac{x - avg(\text{cash})}{std(\text{cash})}$$

Feature extraction can be performed as well. A user's risk of committing opportunistic fraud may be captured using different risk features such as, inter alia: Z-score of amount marked as high risk due to receipt mismatch, zrm; Z-score of amount marked as high risk due to duplicates, zdup; Z-score of amount marked as high risk due to cost out of range, zcor; Z-score of amount marked as high risk due to suspicious merchant category, zmc; Z-score of amount marked as high risk due to abnormal spend, zas; Z-score of amount marked as high risk due to Foreign Corruption Practices Act (FCPA) compliance risk, zfcpa; Z-score of amount marked as high risk due to weekend expense, zweekend; Z-score of amount marked as high risk due to old receipt, zor. Consolidating these features in the following way, the system can calculate a feature that represents user risk using the following equation:

$$\text{risk} = \frac{e^{zrm+zdup+zcor+zmc+zas+zfcpa+zweekend+zor}}{e^{zrm} + e^{zdup} + e^{zcor} + e^{zmc} + e^{zas} + e^{zfcpa} + e^{zweekend} + e^{zor}}$$

User (e.g. an employee, etc.) behavior can also be analyzed as follows. A user's risk of committing opportunistic fraud may be captured using different behavioral features such as: Z-score of amount of cash vs credit card expenses—zcash; Z-score of amount submitted without receipt where receipt was required, z-receipt, etc. These can be consolidated when the system calculates a feature that represents user behavior. A user behavior score can be calculated with the following equation:

$$\text{behavior} = \frac{e^{zcash+zreceipt}}{e^{zcash} + e^{zreciept}}$$

An example model using SVMs is now provided. SVMs can be a set of supervised learning methods used for classification, regression and outliers detection. The advantages of support vector machines in the context of employee profiling are: performs well when number of features is significantly lower than number of training samples; and/or uses a subset of training points in the decision function (called support vectors), so it is memory efficient. For every user in a company, risk and behavior features are constructed based on the above and fed into a machine learning algorithm such as SVM linear kernel model for predicting an overall risk score for the user that may be HIGH, MEDIUM or LOW.

In step 406, expense profiling can be implemented. Again, various machine learning and/or anomaly detection algorithms can be utilized to compute statistical threshold limits for each expense type by studying all (and/or a specified set of) expenses by a company's employees for the same items, events, etc. Example, approaches can include, inter alia: probability-based methods (e.g. using histograms, etc.), distance-based methods (e.g. k-nearest neighbor clustering algorithms, etc.) and the like.

In step 408, K-nearest neighbor clustering algorithms can be used to detect anomalies. For example, process 400 can construct the distance of the current expense to its $k^{th}$ nearest neighbor. If the distance is high comparing to its similar purchase, then the expense is flagged as high risk. It is noted that K-nearest neighbor can be a robust approach to detect anomaly because it is less influenced by the distribution of expenses. For example, consider a restaurant where patrons go for lunches, which are $25 per person. That same restaurant is popular for corporate group where the cost may be around $800 per event. Once, there is enough history of the restaurant available in the system, the k-nearest neighbor algorithm allows finding anomalies based on the clusters, in this example, a $900 spend at the restaurant may not be considered an anomaly since its close to the $800 cluster; whereas a $400 event may be considered an anomaly since its not close to either the $800 cluster or the $25 cluster.

In step 410, historic expense data can be utilized. For example, a general framework can be built to estimate reasonable expenses. The following equations can be used in the framework. The average price can be estimate with P=f(arguments, historical data points). A reasonable range can be constructed with Δ=g(historical data points) and the range=P±Δ. Using this range, it can be determined whether an expense is reasonable. An example of using process 400 for using historic expense data for estimating reasonable taxi fare is now provided. First, a reasonable taxi fare can be estimated using the equation: fare=f(optimized distance, travel time, starting location, historical means of taxi fare per miles in the area). Then Δ=g(all relevant historical expenses) with a reasonable range=fare±Δ.

Figure 5:
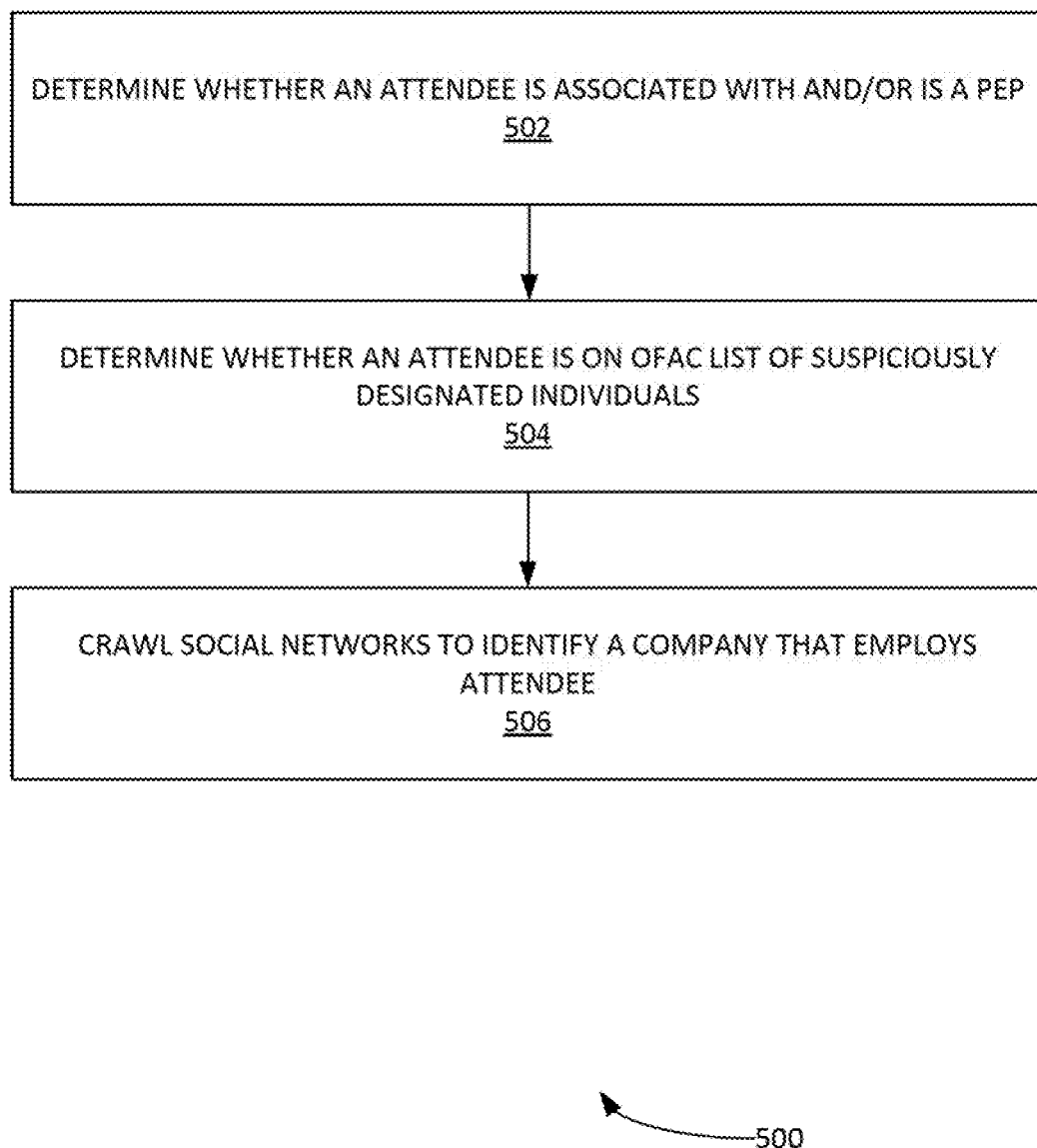
FIG. 5 illustrates an example process of employee attendance verification, according to some embodiments.

FIG. 5 illustrates an example process 500 of employee attendance verification, according to some embodiments. In step 502, it can be determined whether an attendee is associated with and/or is a Politically Exposed Person (PEP). For example, step 502 can include crawling various databases (e.g. DBPedia, data.gov.us, data.gov.uk, web searches, etc.) to build and store profiles of PEPs in a local computer memory. Step 502 can apply machine learning on Wikipedia descriptions to determine whether an attendee is associated with and/or is a PEP. Step 502 can apply clustering techniques and/or semantic analysis on news articles to determine whether an attendee is associated with and/or is a PEP. In step 504, it can be determined whether an attendee is on OFAC list of suspiciously designated individuals. In step 506, process 500 determine whether an attendee is fictional. For example, step 506 can crawl LinkedIn® and/or other social networks to identify a company that the attendee is working for. This can include locating the attendee's job title and/or position within said company. There are two steps to identifying PEP individuals. In the first step, a textual model is created by crawling sources such as Wikipedia and creating a semantic model of the abstract associated with persons classified such as national and local politicians, judges, lobbyists etc. Frequency distributions and other semantic techniques such as contextual proximity to the subject in the text are used create a set of PEP indicator phrases that are representative of such entities. For example, words such as "elected" "democratic", "politician" and "armed forces" are some of the phrases learnt by the system. In the second step, the Web is searched for the individual in person and a vector is created of words found to describe the individual. In this example, if the individual was "John Doe", the fictional police of chief of San Francisco, The system would correctly identify the individual as an PEP, because the individual is associated with multiple articles that has PEP indicator phrases including "elected" and "police department".

Figure 6:
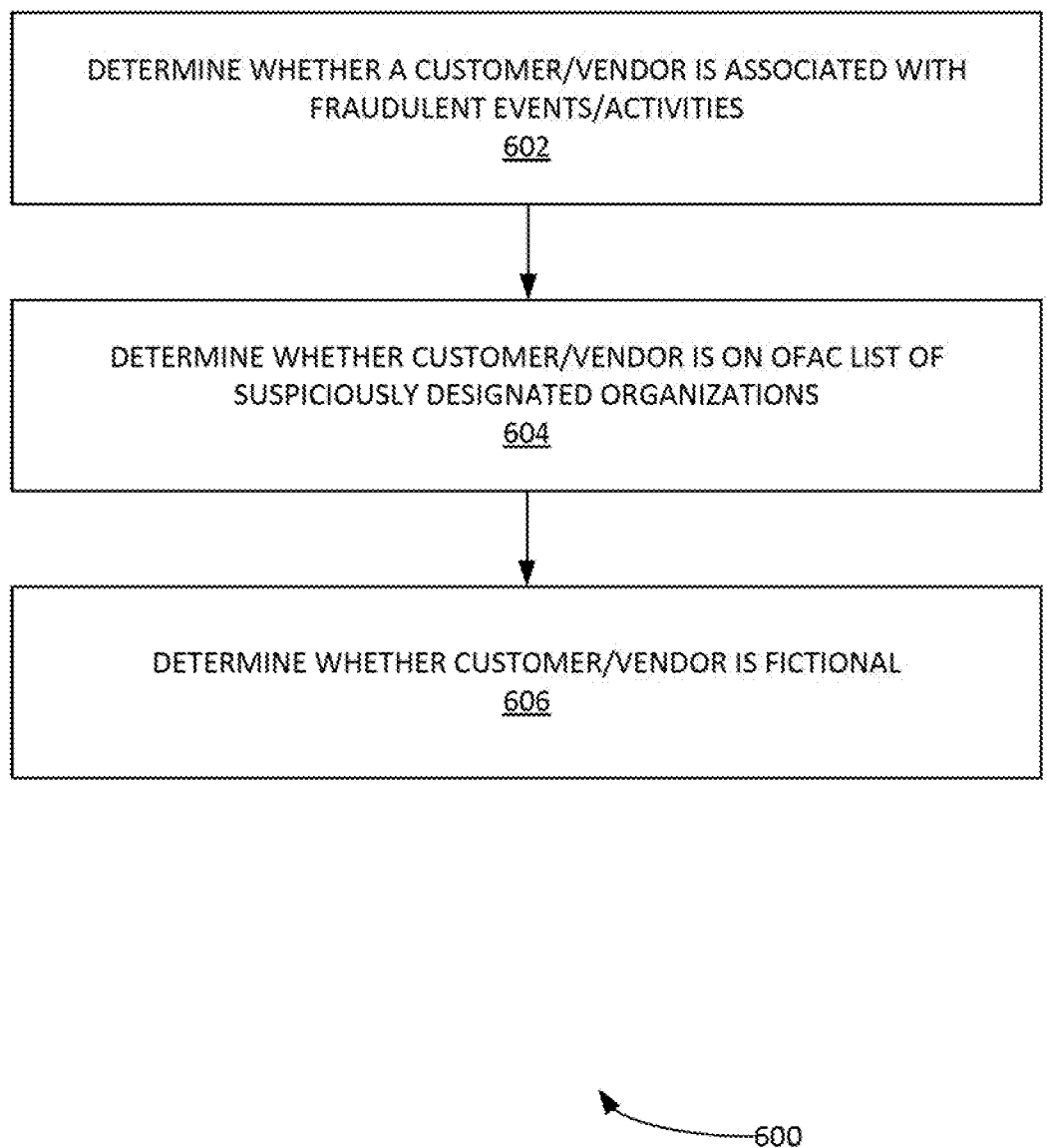
FIG. 6 illustrates an example process of customer and/or vendor verification, according to some embodiments.

FIG. 6 illustrates an example process 600 of customer and/or vendor verification, according to some embodiments. In step 602, process 600 can determine whether a customer/vendor is associated with fraudulent events/activities. For example, step 602 can include crawling various databases (e.g. DBPedia, data.gov.us, data.gov.uk, web searches, etc.) to build and store profiles of customers/vendors in a local computer memory. Step 602 can apply machine learning on news articles to determine whether a customer/vendor is associated with fraudulent events/activities. Step 602 can conduct an address verification to determine that the customer and/or vendor has an address. In step 604, process 600 can determine whether customer/vendor is on OFAC list of suspiciously designated organizations. In step 606, process 600 can determine whether customer/vendor is fictional (e.g. based on the output of steps 602 and/or 604).

Figure 7:
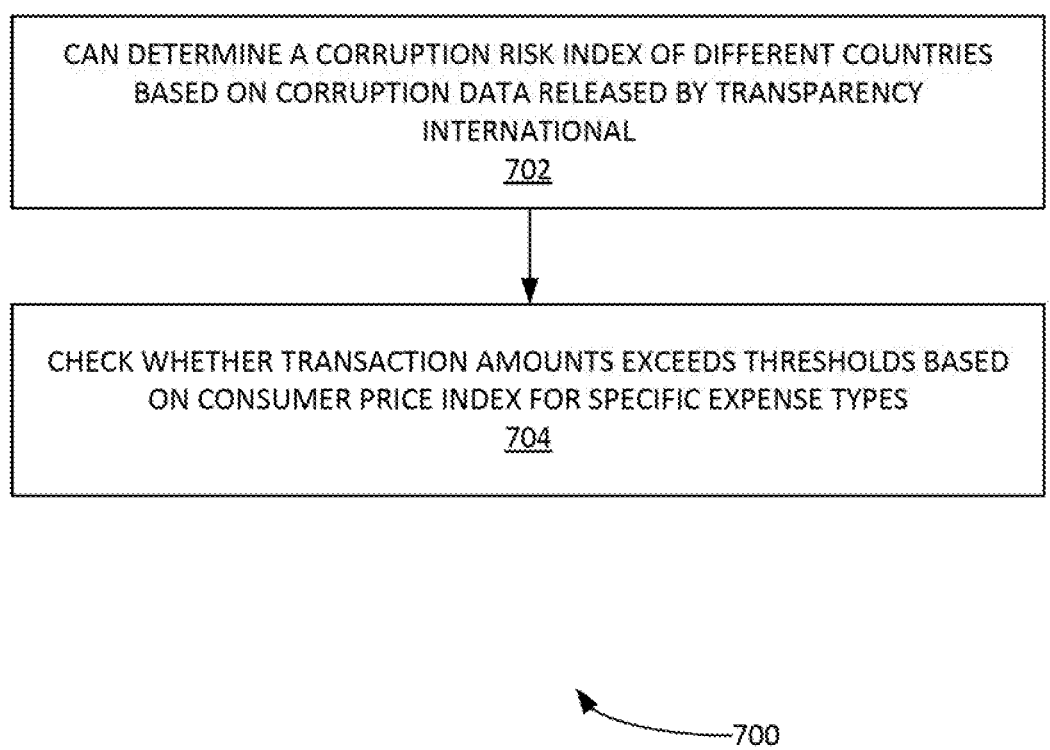
FIG. 7 illustrates an example process or determining expense location risk, according to some embodiments.

FIG. 7 illustrates an example process 700 for determining expense location risk, according to some embodiments. In step 702, process 700 can determine a corruption risk index of different countries based on corruption data released by Transparency International and/or another organization that publishes corruption indices about various geographic regions. In step 704, process 700 can check whether transaction amounts exceed thresholds based on consumer price index for specific expense types like meals, gifts, entertainment, etc.

Figure 8:
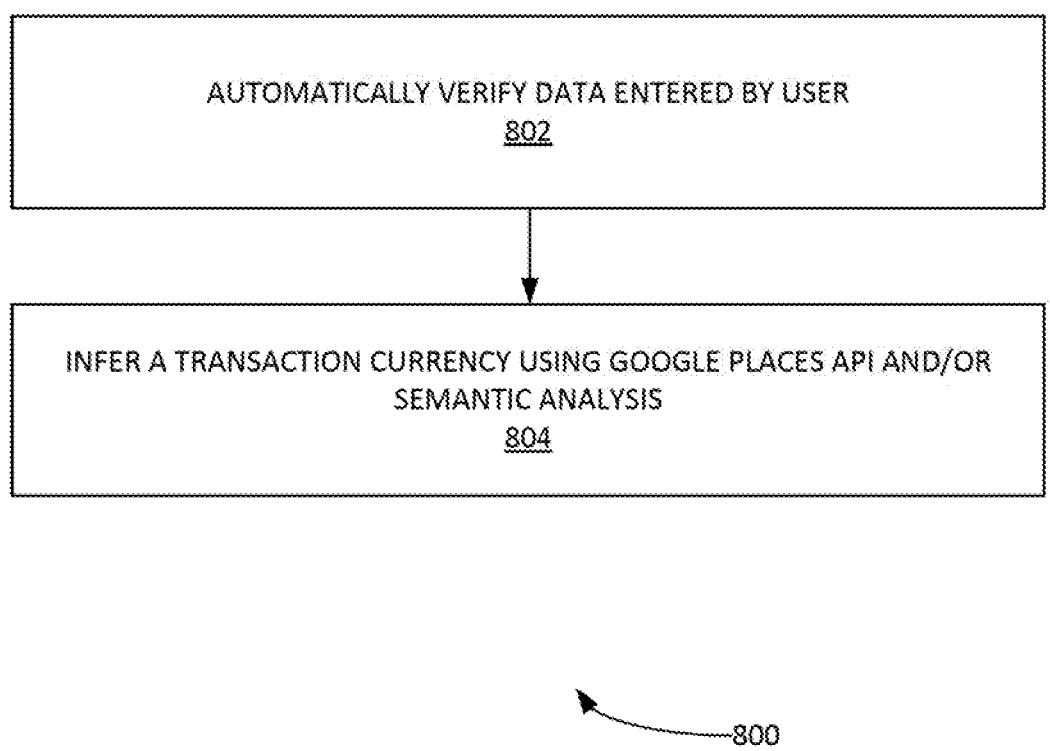
FIG. 8 illustrates an example process for receipt verification, according to some embodiments.

FIG. 8 illustrates an example process 800 for receipt verification, according to some embodiments. The receipt can be associated with an expense report. In step 802, process 800 can automatically verify data entered by user (e.g. transaction amount, date, currency, etc.) against data extracted from a receipt through OCR. In step 804, process 800 can infer a transaction currency using Google Places API and/or semantic analysis (e.g. when currency is not present in receipt, etc.).

Figure 9:
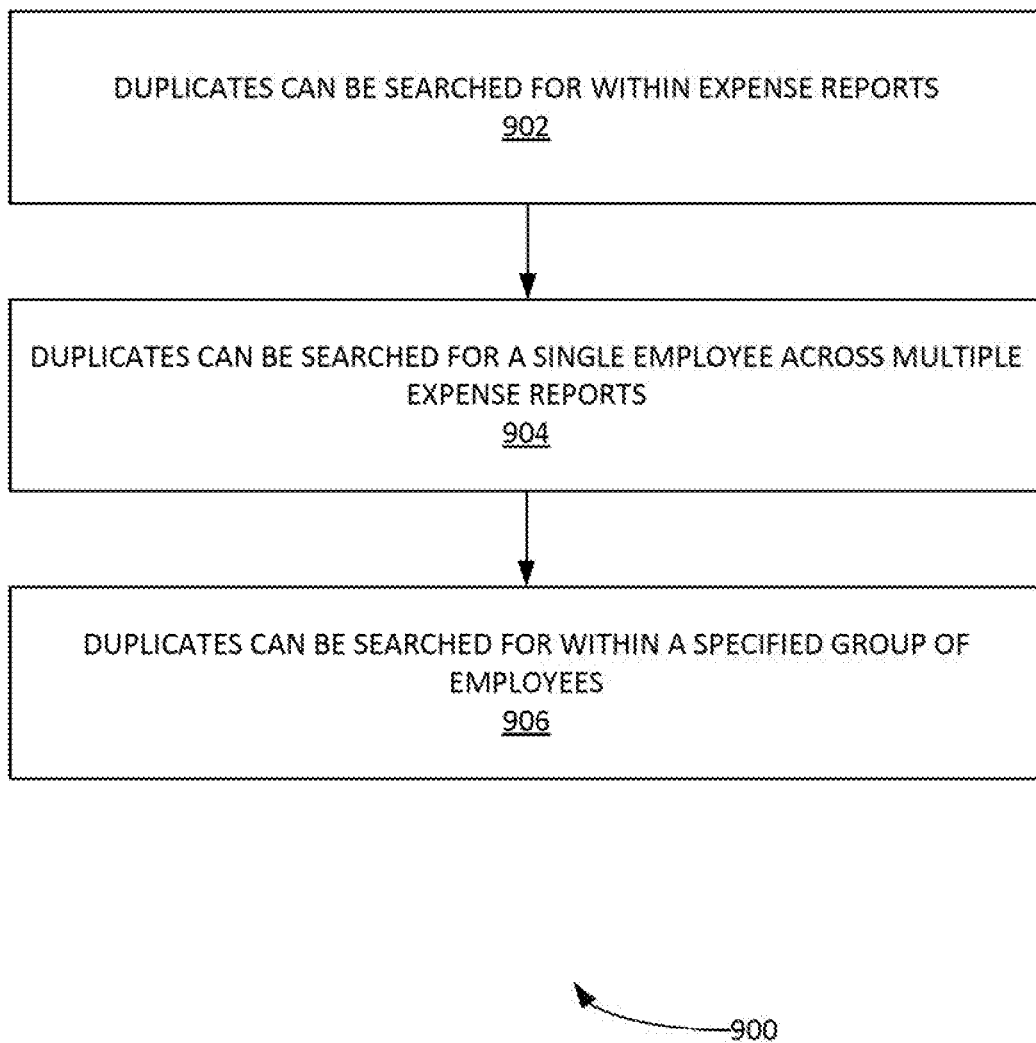
FIG. 9 illustrates an example process of duplicate detection, according to some embodiments.

FIG. 9 illustrates an example process 900 of duplicate detection, according to some embodiments. For example, a set of duplicate checks that have been issued to a single employee can be searched for by process 900. In step 902, duplicates can be searched for within expense reports. In step 904, duplicates can be searched for a single employee across multiple expense reports. In step 906, duplicates can be searched for within a specified group of employees. Process 900 can consider both data entered by user and data retrieved from receipts (e.g. receipts that have been scanned and have had OCR applied, etc.).

Figure 10:
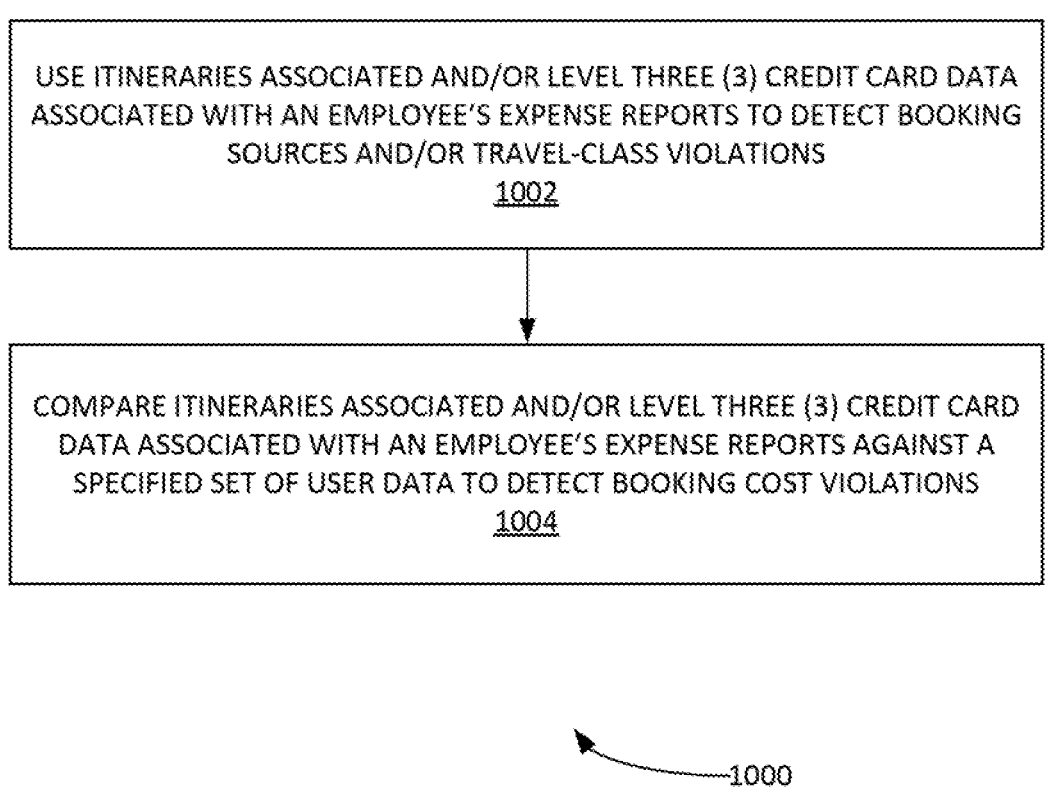
FIG. 10 illustrates an example process for detecting travel violations by an employee, according to some embodiments.

FIG. 10 illustrates an example process 1000 for detecting travel violations by an employee, according to some embodiments. In step 1002, process 1000 can use itineraries associated and/or level three (3) credit card data associated with an employee's expense reports to detect booking sources and/or travel-class violations. In step 1004, process 1000 can compare itineraries associated and/or level three (3) credit card data associated with an employee's expense reports against a specified set of user data to detect booking cost violations.

The methods and processes provided supra can be utilized to ensure compliance with an enterprise's policies including, inter alia: allowable expense amount per expense type, annual spend limits for particular expense types, daily spend limits at different locations for particular expense types, limits on purchase frequency of items such as alcohol, and/or travel booking provider and travel class policies.

Exemplary Systems and Computer Architecture

Figure 11:
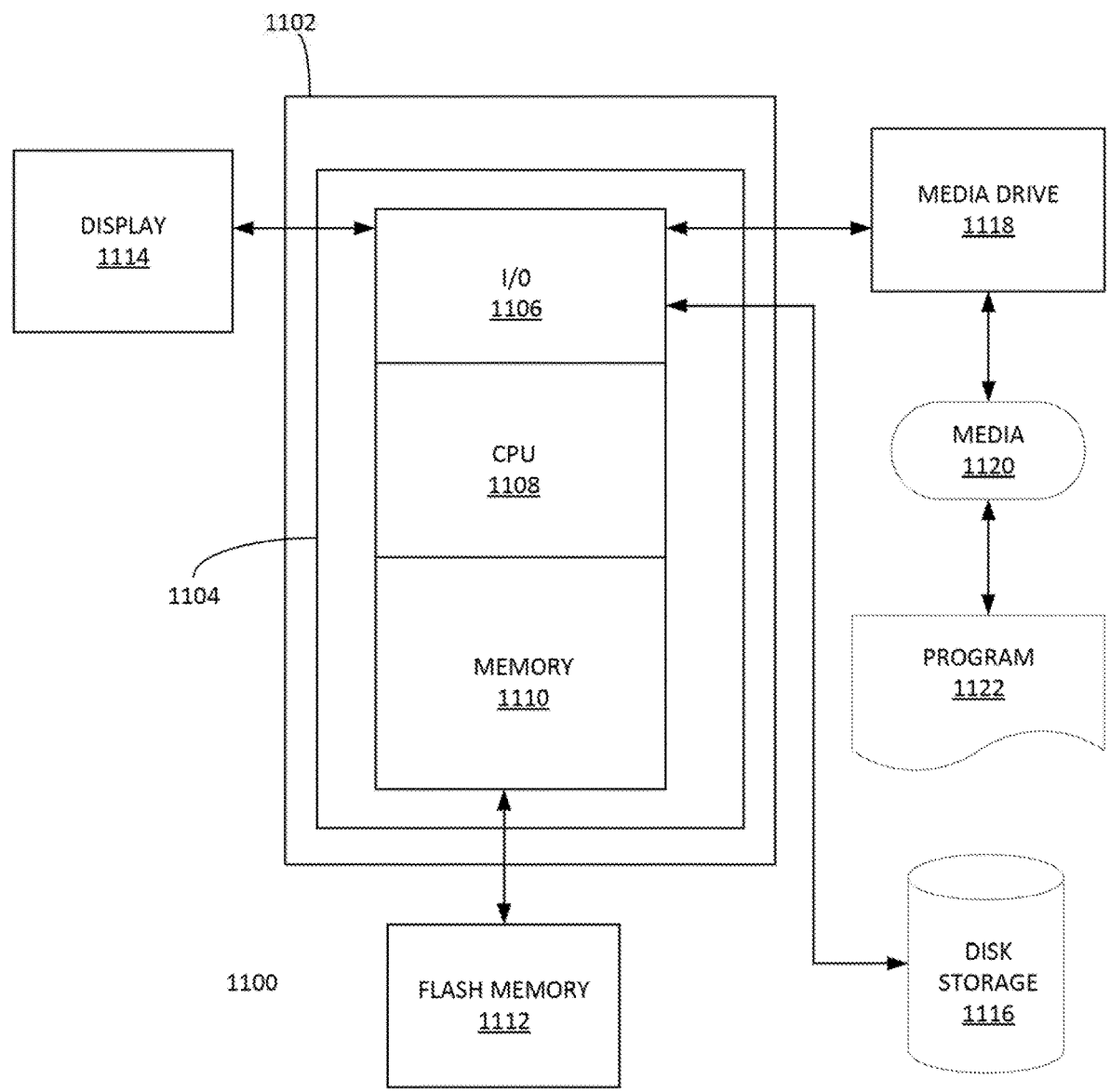
FIG. 11 is a block diagram of sample-computing environment that can be utilized to implement some embodiments.

FIG. 11 depicts an example computing system 1100 that can be configured to perform any one of the processes provided herein. In this context, computing system 1100 may include, for example, a processor, memory, storage, and I/O devices monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi protocols, Bluetooth® (and/or other standards for exchanging data over short distances includes those using short-wavelength radio transmission), cellular data network protocols, short messaging system protocols, TCP/HTTP protocols, etc.

Figure 12:
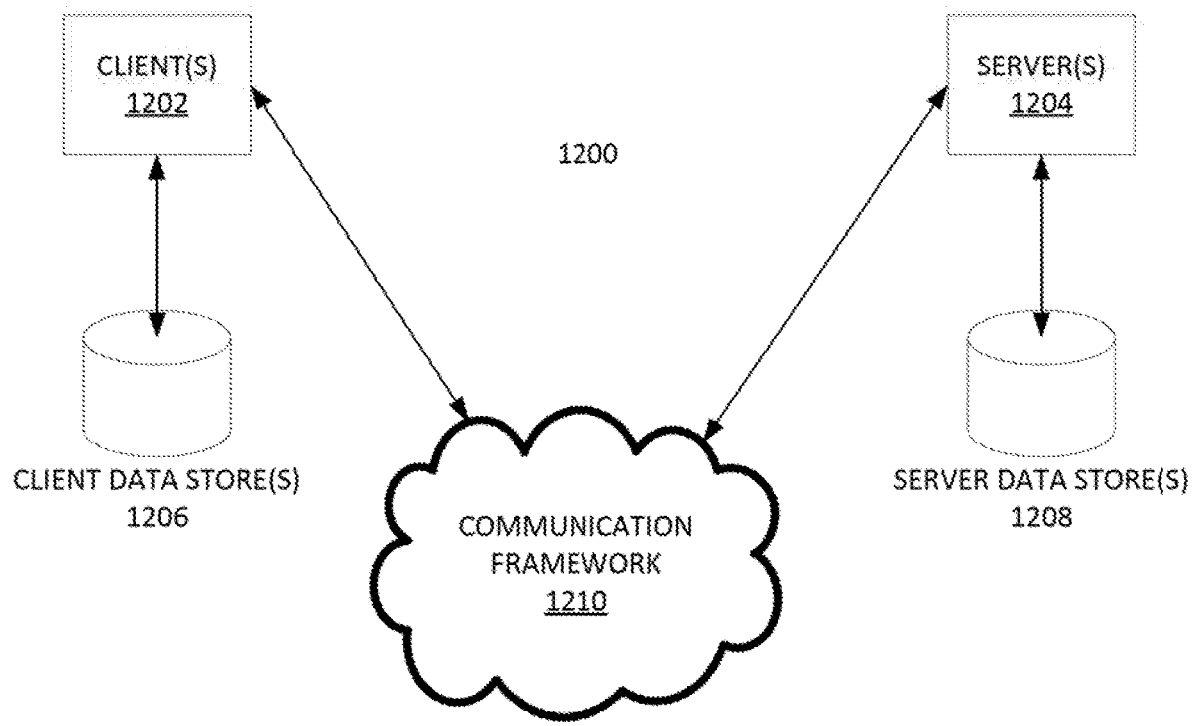
FIG. 12 is a block diagram of a sample-computing environment that can be utilized to implement some embodiments.

FIG. 12 is a block diagram of sample-computing environment 1200 that can be utilized to implement some embodiments. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1210 that can be employed to facilitate communications between the client(s) 1202 and the server(s) 1204. The client(s) 1202 are connected to one or more client data store(s) 1206 that can be employed to store information local to the client(s) 1202. Similarly, the server(s) 1204 are connected to one or more server data store(s) 1208 that can be employed to store information local to the server(s) 1204.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A computerized method for detecting anomalies in expense reports of an enterprise comprising:
by at least one processor operative in a server:
implementing a semantic analysis algorithm on the expense report submitted by an employee, wherein the semantic analysis algorithm comprises: building a set of data structures from the expense report data, wherein the expense report data is provided in a computer-readable format,
providing the set of data structures from the expense report data to a probabilistic information engine that uses an expense ontology, wherein the expense ontology defines a set of categories of expenses and expense attributes, and
with the probabilistic information engine, determining at least one transaction expense type in the expense report based on the expense topology;
obtaining an augmentation of the expense report data with a set of web scale data, wherein the web scale data is obtained from a World Wide Web source that is queried to augment an employee-entered data on the expense report from World Wide Web source that is based on the expense type;
applying one or more machine learning algorithms, wherein the one or more machine learning algorithms comprises a K-nearest neighbor clustering algorithm, that detects an anomaly in the expense report data by:
creating one or more clusters of expense data from the web scale data and a set of historic expense data;
mapping the expense report data based on the set of data structures of the expense report data; and
constructing a distance of a current expense of the expense report data to its kth nearest neighbor of the one or more clusters of expense data from the web scale data and the set of historic expense data;
determining that the distance of the current expense to its kth nearest neighbor is greater than a specified distance; and
flagging the current expense as high risk;
wherein the one or more machine learning algorithms comprises a Support vector machines (SVMs) linear kernel model, wherein the SVM linear kernel model is trained using a specified number of training samples of employees in a company to be memory efficient, and with the SVM linear kernel model, predicting an overall risk score for an employee associated with the expense report data;
based on a high-risk flag and the risk score of the employee, identifying an inappropriate expense in the expense report data;
scanning a set of receipts associated with a past expense report data;
implementing an optical character recognition process on the set of receipts, wherein the set of receipts are placed in a computer-readable format;
verifying that the set of receipts are associated with the expense report data by matching a transaction amount and a matching date between a scanned receipt of the set of receipts and the expense report data;
determining that the employee or any employee has previously claimed an expense in the expense report data; and displaying the expense report data on a web browser interface.

2. The computerized method of claim 1, wherein the expense report data comprises an expense report textual data such as user justification of expenses and merchant names, attendee names and locations.

3. The computerized method of claim 2, wherein the expense report data comprises an expense report structured data such as an expense cost in foreign currency, an expense cost in home currency, an exchange rate and expense date.

4. The computerized method of claim 3 further providing:
determining at least one corruption issue or bribery issue in the expense report data.

5. The computerized method of claim 4 further comprising:
determining that the employee has followed a travel guideline of the enterprise.

6. The computerized method of claim 5, wherein the one or more machine learning methods comprises a kernel algorithm.

7. The computerized method of claim 6, wherein the one or more machine learning methods comprises a logistic regression algorithm.

8. The computerized method of claim 7, wherein the one or more machine learning methods comprises a radial basis kernel algorithm.

9. The computerized method of claim 8 further comprising:
implementing the one or more machine learning algorithms on a set historical expense data as provided in a set of historical expense reports associated with an employee to identify habitual, opportunistic and accidental fraud in a spending pattern of the employee.

10. The computerized method of claim 9 further comprising:
calculating an estimate reasonable expenses comprising the steps of:

calculating an average price estimated with P=f(arguments, historical data points);
calculating a reasonable range with Δ=g(historical data points); and
setting the reasonable range with the following equation: reasonable range=P±Δ; and
determining that an expense in the expense report data exceeds the reasonable range.

11. A computerized system comprising:
a processor configured to execute instructions;
a memory containing instructions when executed on the processor, causes the processor to perform operations that:
automatically implements a semantic analysis algorithm on an expense report data submitted by an employee, wherein the expense report data is provided in a computer-readable format, and wherein the semantic analysis algorithm comprises building a set of data structures derived from the expense report data submitted by an employee, wherein the expense report data is provided in a computer-readable format,
wherein the semantic analysis algorithm provides the set of data structures from the expense report data to a probabilistic information engine that uses an expense ontology, wherein the expense ontology defines a set of categories of expenses and expense attributes, and with the probabilistic information engine, determines at least one transaction expense type in the expense report based on the expense topology;
obtains an augmentation of the expense report data with a set of web scale data, wherein the web scale data is obtained from a World Wide Web source that is queried to augment an employee-entered data on the expense report from World Wide Web source that is based on the expense type;
applies one or more machine learning algorithms, wherein the one or more machine learning algorithms comprises a K-nearest neighbor clustering algorithm, that detects an anomaly in expense report data by:
creating one or more clusters of expense data from the web scale data; maps the expense report data based on the set of data structures that comprise the expense report data;
constructing a distance of the current expense to its kth nearest neighbor of the one or more clusters of expense data from the web scale data;
determining that the distance of the current expense to its kth nearest neighbor is greater than a specified distance; and
flagging the current expense as high risk; and
automatically, with one or more machine learning algorithms, detects an anomaly in the expense report data;
wherein the one or more machine learning algorithms comprises a Support vector machines (SVMs) linear kernel model, wherein the SVM linear kernel model is trained using a specified number of training samples of employees in a company to be memory efficient, and with the SVM linear kernel model, predicting an overall risk score for an employee associated with the expense report data;
based on a high-risk flag and the risk score of the employee, automatically identifies an inappropriate expense in the expense report data; and
displays the expense report data on a web browser interface.

12. The computerized system of claim 11, wherein the expense report data comprises an expense report textual data.

13. The computerized system of claim 12, wherein the expense report data comprises an expense report structured data.

14. The computerized system of claim 13, wherein the memory containing instructions when executed on the processor, causes the processor to perform operations that automatically determines at least one corruption issue or bribery issue in the expense report data.

15. The computerized method of system 14 wherein the memory containing instructions when executed on the processor, causes the processor to perform operations that:
automatically determines that the employee has followed a travel guideline of the enterprise.

16. The computerized system of claim 15, wherein the one or more machine learning methods comprises a support vector machine algorithm and a kernel algorithm.

17. The computerized system of claim 16, wherein the one or more machine learning methods comprises a logistic regression algorithm.

18. The computerized system of claim 17, wherein the one or more machine learning methods comprises a radial basis kernel algorithm.

19. The computerized system of claim 18 wherein the memory containing instructions when executed on the processor, causes the processor to perform operations that:
automatically implements the one or more machine learning algorithms on a set historical expense data as provided in a set of historical expense reports associated with an employee to identify habitual, opportunistic and accidental fraud in a spending pattern of the employee.

20. The computerized system of claim 19 wherein the memory containing instructions when execute on the processor, causes the processor to perform operations that:
automatically calculates an estimate reasonable expenses comprising the steps of;
automatically calculating an average price estimated with P f(arguments, historical data points);
automatically calculates a reasonable range with Δ=g (historical data points); and
automatically sets the reasonable range with the following equation: reasonable range=P±ΔA; and
automatically determines that an expense in the expense report data exceeds the reasonable range.

* * * * *